United States Patent [19]

Szejtli et al.

[11] Patent Number: 4,542,211
[45] Date of Patent: Sep. 17, 1985

[54] PROCESS FOR THE MANUFACTURE OF HEPTAKIS-[2,6-DI-O-METHYL]-BETA-CYCLODEXTRIN

[75] Inventors: Jozsef Szejtli, Budapest; Andras Liptak, Debrecen; Pal Nanasi, Debrecen; Peter Fügedi, Debrecen; Ildiko Jodal, Debrecen; Lili Kandra, Debrecen; Lorant Janossy, Debrecen, all of Hungary

[73] Assignee: Consortium Für Elektrochemische Industrie GmbH, Munich, Fed. Rep. of Germany

[21] Appl. No.: 586,203

[22] Filed: Mar. 5, 1984

[30] Foreign Application Priority Data

Mar. 11, 1983 [HU] Hungary ................................ 838/83

[51] Int. Cl.⁴ ............................................. C08B 37/00
[52] U.S. Cl. .................................................... 536/103
[58] Field of Search ......................................... 536/103

[56] References Cited

U.S. PATENT DOCUMENTS 2,116,867  5/1938  Kreimeier et al. ................... 536/103

FOREIGN PATENT DOCUMENTS 58-173102  10/1983  Japan .................................... 536/103

*Primary Examiner*—Ronald W. Griffin
*Attorney, Agent, or Firm*—Collard, Roe & Galgano

[57] ABSTRACT

The invention relates to a process for the manufacture of heptakis-[2,6-di-O-methyl]-beta-cyclodextrin by methylating beta-cyclodextrin in an organic phase wherein beta-cyclodextrin is methylated with dimethylsulfate in the presence of an alkalihydroxide at temperatures of from $-10°$ to $0°$ C.

10 Claims, No Drawings

PROCESS FOR THE MANUFACTURE OF HEPTAKIS-[2,6-DI-O-METHYL]-BETA-CYCLODEXTRIN

The invention relates to a process for the manufacture of heptakis-[2,6-di-O-methyl]-beta-cyclodextrin, herein also referred to as dimethyl-beta-cyclodextrin, by methylating beta-cyclodextrin in an organic medium.

The partially methylated derivatives of beta-cyclodextrin have between 1 and 20 OH-groups which are substituted by methoxy-groups. Accordingly, these derivatives are characterized by an average substitution degree per beta-cyclodextrin-moiety. The monomethyl derivative, having 7 methoxy-groups per molecule of beta-cyclodextrin and the dimethyl-beta-cyclodextrin having 14 methoxy-groups per molecule of beta-cyclodextrin, are deserving of special attention.

There are known a number of processes for methylating cyclodextrin wherein either aqueous or organic media are used.

According to Hungarian Pat. No. 180 580, the methylation is carried out in an aqueous medium. Disadvantageously, the methylation has to be carried out in several steps in order to achieve a methylation degree that corresponds to dimethyl-beta-cyclodextrin.

According to "Berichte", 69, 2041, 1936, permethylation of alpha-cyclodextrin to hexakis-[2,3,6-tri-O-methyl]-alpha-cyclodextrin is performed in liquid ammonia in the presence of metallic potassium in one step. However, methylation of beta-cyclodextrin using the same method, is only achieved after 18 repeated methylation steps.

According to "Tetrahedron", 24, 803, 1968, permethylation of alpha- and beta-cyclodextrin was successfully achieved using methyl-iodide in dimethylformamide solution in the presence of barium oxide. In the same publication there is further described the selective methylation of alpha- and beta-cyclodextrin to form crystalline hexakis-[2,6-di-O-methyl]-alpha-cyclodextrin and heptakis-[2,6-di-O-methyl]-beta-cyclodextrin, respectively, wherein methylation was performed with dimethylsulfate in a 1:1 mixture of dimethylformamide and dimethylsulfoxide in the presence of barium oxide or barium hydroxide.

According to Bioorg. Chem. 5, 121, 1976 and "Stärke", 28, 226, 1976 and "Stärke", 26, 111, 1974, there are described processes for the selective methylation to form monomethyl derivatives of cyclodextrins, wherein methylation was carried out either in organic media in the presence of barium salts or selective methylation was ensured by previously adding protective groups.

Generally, permethylation of cyclodextrins is easier to carry out than selective methylation. Usually, the methylation reactions are carried out in organic solvents. According to the prior art, selective methylation of beta-cyclodextrins avoiding the methylation reaction at the C-3-position, was successfully carried out using barium salts. Disadvantageously, the presence of barium salts which have to be used in stochiometric amounts in organic media results in highly viscous reaction mixtures, which cannot be processed when working on an industrial scale. Furthermore, using the poisonous barium salts brings about considerable toxic and environmental problems.

Of practical interest among the partially methylated cyclodextrins is heptakis-[2,6-di-O-methyl]-beta-cyclodextrin due to its complexing properties. Reference is made to "Carbohydride Research", 76, 59, 1979, and Hungarian patent application No. 1141/80.

It is therefore an object of the invention to develop a process for the partial methylation of beta-cyclodextrin, which enables the manufacture of heptakis-[2,6-di-O-methyl]-beta-cyclodextrin on an industrial scale while avoiding the formation of toxic by-products.

It has now been found according to the invention that the methylation of beta-cyclodextrin in organic medium in the presence of an alkalihydroxide is achieved with high selectivity with the formation of heptakis-[2,6-di-O-methyl]-beta-cyclodextrin if the methylation is carried out using dimethylsulfate within the temperature range of $-10°$ to $0°$ C.

The subject of the invention is therefore a process for the manufacture of heptakis-[2,6-di-O-methyl]-beta-cyclodextrin by methylating beta-cyclodextrin in an organic medium, that is characterized in that beta-cyclodextrin is methylated with dimethylsulfate in the presence of an alkalihydroxide at temperatures of from $-10°$ to $0°$ C.

Dimethylformamide is preferably used as the organic solvent. Other examples of organic media are dimethylsulfoxide or mixtures of dimethylformamide and dimethylsulfoxide.

Usually, solutions of beta-cyclodextrin in the organic solvent are used with concentrations of from 1 to 15 percent by weight, and, preferably, from 8 to 12 percent by weight.

Examples of alkalihydroxides are sodium hydroxide and potassium hydroxide, but sodium hydroxide is preferred. Preferably, the alkalihydroxide is used in pulverized form. The grain size lies in the range of from 10 to 100 um, and preferably, in the range of from 10 to 30 um. The alkalihydroxide is preferably employed in a dried state.

The alkalihydroxide is applied in at least an equimolar amount, calculated on the amount of OH-groups to be methylated.

It is, however, preferable to use the alkalihydroxides in excess: preferably from 15 to 25 moles, preferably about 20 moles, of alkalihydroxide are employed per 1 mole of beta-cyclodextrin.

As a methylating agent dimethylsulfate, optionally freshly distilled, is used. The amount of methylating agent preferably comes up to from 15 to 25 moles, especially about 20 moles, per 1 mole of beta-cyclodextrin.

Usually the process is carried out as follows: a solution of beta-cyclodextrin in dimethylformamide or dimethylsulfoxide or mixtures thereof are cooled down to a temperature of from $-10°$ to $0°$ C. Thereafter, the intended amount of alkalihydroxide is added. Finally, dimethylsulfate is poured in under vigorous stirring while the temperature of the reaction mixture is maintained in the range of from $-10°$ to $0°$ C., preferably from $-7°$ to $-3°$ C.

The progress of the methylation reaction is usually controlled by taking samples and taking thin-layer chromatograms thereof. As a rule, the methylation reaction is stopped as soon as the amount of desired product no longer increases. In the process according to the present invention, a reaction mixture is obtained that contains, relative to the amount of methylated beta-cyclodextrin, about 70 parts by weight of the desired product and about 30 parts by weight of beta-cyclodextrin, having a higher or a lower methylation degree.

Finally, the methylation reaction is stopped by adding an aqueous solution of ammonia. During this procedure the reaction mixture may be heated. In order to ensure that the excess dimethylsulfate is quantitatively removed, the reaction mixture may be heated to a temperature of about 80° C.

Working-up the reaction mixture is performed as follows: the reaction mixture is diluted with water and an organic solvent is added which is immiscible with water, such as, for instance, methylene chloride or chloroform, to produce an organic/aqueous 2-phase-system. The desired product is extracted in the organic phase. After removing the solvent and, optionally, drying the product at temperatures of up to 120° C., a syrupy product is obtained.

Usually the crude product is recrystallized in water. This is made possible as a result of the fact that dimethyl-beta-cyclodextrin is soluble in cold water but insoluble in hot water. By this process, dimethyl-beta-cyclodextrin is obtained as a crystalline, colorless product.

The crude product may as well be worked up by other or additional methods such as, for example, chromatography.

In the process according to the present invention, heptakis-[2,6-di-O-methyl]-beta-cyclodextrin is obtained in a one-step-process in good yield. The process allows for the first time production on an industrial scale which is the precondition for the application of the product in large amounts, for example in the pharmaceutical sector, in the sectors of plant protection and cosmetics or in the food industry.

The invention will now be explained more fully in an example which is, however, only given by way of illustration and not of limitation.

EXAMPLE 11.35 g (0.01 moles) of dried beta-cyclodextrin were dissolved in 100 ml of anhydrous dimethylformamide and cooled down under vigorous stirring to −7° C. Thereafter, 8.4 g (0.21 moles) of pulverized sodium hydroxide (medium grain size 20 um) were added in portions within 10 minutes. Thereafter, 20 ml (0.21 moles) of freshly distilled dimethylsulfate were added drop by drop within 15 minutes. The reaction temperature was maintained in the range of from −7° to −5° C. The reaction mixture was then stirred for another 4 hours at a temperature of from −3° to −5° C. The progress of the methylation reaction was controlled by taking samples and taking thin-layer chromatograms thereof. After a reaction time of 4 hours, the amount of desired product did not increase. The thin-layer chromatogram showed the following distribution among the methylated cyclodextrins: 7 parts of the desired product, 1.5 parts of overmethylated beta-cyclodextrin and 1.5 parts of undermethylated beta-cyclodextrins.

Thereafter, 20 ml of an aqueous solution of ammonia (25% by weight of ammonia) were added to the reaction mixture. The reaction mixture was heated at first to 20° C. and, subsequently, under stirring to 80° C.

Thereafter, 100 ml of water were added to the reaction mixture and, finally, the reaction mixture was extracted four times with 200 ml of methylene chloride. The organic phase was washed two times with 300 ml of water and subsequently dried with sodium sulfate. After removing the solvent the product was dried at 120° C. in a vacuum.

A syrupy crude product was obtained which was recrystallized from water. The crude product was first dissolved in 30 ml of cold water, heated to 80° C. and filtered on a preheated filter. After repeating the recrystallization procedure three times, 3.27 g (24.6% of the theoretical yield) of the desired product were obtained; melting range 278° to 285° C.

While only one example of the present invention has been described, it is obvious that many changes and modifications may be made thereunto, without departing from the spirit and scope of the invention.

What is claimed is:

1. In a process for the manufacture of heptakis-[2,6-di-O-methyl]-beta-cyclodextrin by methylating beta cyclodextrin in an organic medium, the improvement comprising the step of methylating beta-cyclodextrin with dimethylsulfate in amounts of from 15 to 25 moles per 1 mole of beta-cyclodextrin in the presence of an alkalihydroxide, wherein said alkalihydroxide is applied in at least an equimolar amount calculated on the amount of OH-groups to be methylated; at temperatures of from −10° to 0° C.

2. The process of claim 1, wherein said alkalihydroxide is used in pulverized form.

3. The process of claim 2, wherein said alkalihydroxide is NaOH having a grain size of from 10 to 100 um.

4. The process of claim 1, wherein a member selected from the group consisting of dimethylsulfoxide, dimethylformamide and mixtures thereof is used as said organic medium.

5. The process of claim 4, wherein said organic medium is dimethylformamide.

6. The process of claim 1, wherein 15 to 25 moles of said alkalihydroxide are employed per 1 mole of beta-cyclodextrin.

7. The process of claim 6, wherein approximately 20 moles of said alkalihydroxide are employed per 1 mole of beta-cyclodextrin.

8. The process of claim 1, wherein approximately 20 moles of said dimethylsulfate is employed per 1 mole of beta-cyclodextrin.

9. The process of claim 1, wherein said dimethylsulfate is freshly distilled.

10. The process of claim 1, wherein said step of methylating beta-cyclodextrin has an alkylation degree of 14 whereby the manufacture of heptakis-[2,6-di-O-methyl]-beta-cyclodextrin is able to be performed in one methylation step.

* * * * *